May 30, 1967  A. B. MAXAM, JR  3,321,863

MODEL CAR WHEEL MOUNTING

Filed July 13, 1965

INVENTOR.
ALLEN B. MAXAM, JR.
By Beehler & Arant
ATTORNEYS.

3,321,863
MODEL CAR WHEEL MOUNTING
Allen B. Maxam, Jr., 218 W. Palm,
Burbank, Calif. 91502
Filed July 13, 1965, Ser. No. 471,541
3 Claims. (Cl. 46—221)

The invention relates to self-propelled model automobiles, primarily of the type used in racing.

A sport of appreciable magnitude has recently developed in the racing of self-propelled model automobiles. Improvements in electric motor power and remote controls have made this possible. The sport has now developed to the point where race tracks have become available for use by model racers who indulge in the sport and considerable interest has developed in producing model cars of precision construction which respond accurately to the skill of the driver and where there is a considerable premium on a car which, properly manipulated, can negotiate a course in the lowest possible time.

Race tracks which are available, of course, have appreciable curves and the surfaces is not always smooth. Cars are relatively light in weight and when they negotiate the track at relatively high speeds, when not properly built the are liable to bounce off the track or waste time in getting around the curves. Since seconds and fractions of seconds count a model car which vibrates too much and does not respond effectively to control is at a disadvantage. Concentricity of wheel mountings is an extremely important phase of model car construction.

Heretofore, some model cars have had wheels fastened to axles by a screw threading, although this makes a secure form of attachment for the wheel, there is a limit to the precision which can be expected of a threaded engagement. Precise concentricity between the wheel and the axle cannot be assured. Other forms of wheel mountings have been even less precise in their concentricity.

It is, therefore, among the objects of the invention to provide a new and improved wheel mounting for model cars which is dependably precise for all types of wheels and axles which may be encountered.

Another object of the invention is to provide a new and improved wheel mounting for model cars which is of such construction that precision can be assured.

Still another object of the invention is to provide a new and improved wheel mounting for model cars which is simple and easy to use and which permits wheels to be removed and replaced with appreciable ease.

Still further among the objects of the invention is to provide a new and improved model car wheel mounting which is neat in appearance, simple in design, dependable in construction, and which is relatively inexpensive.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
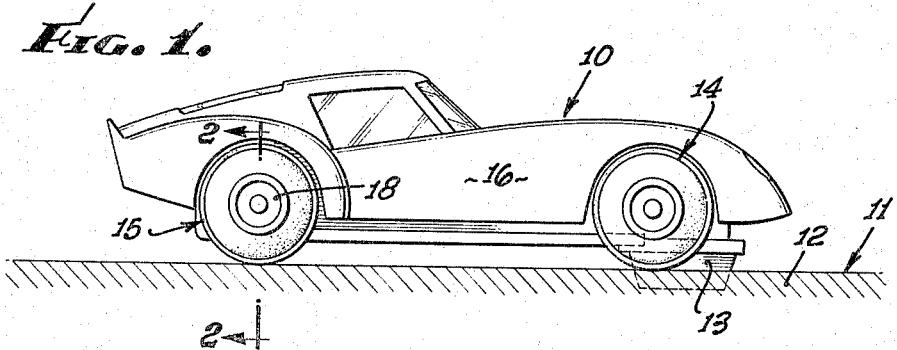
FIGURE 1 is a side elevational view of a typical model car used for racing.
Figure 2:
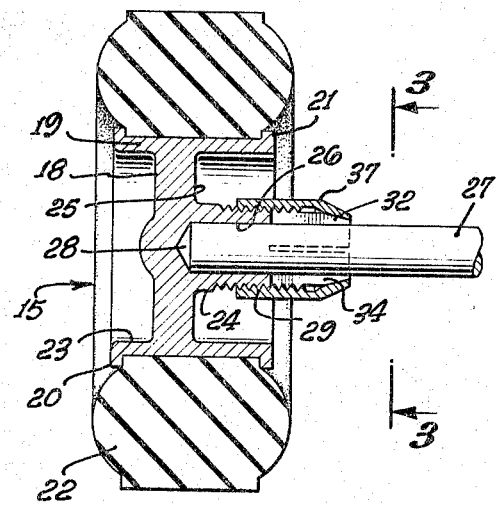
FIGURE 2 is a longitudinal sectional view of a wheel mounted upon an axle, taken on the line 2—2 of FIGURE 1.
Figure 3:
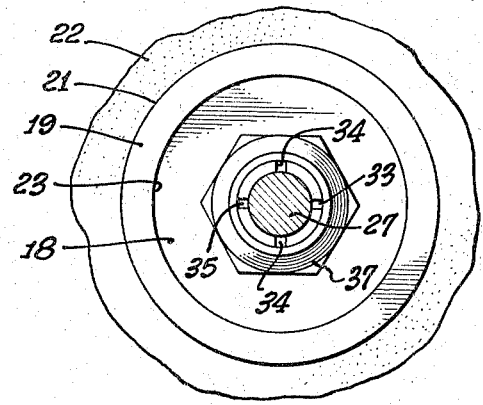
FIGURE 3 is cross-sectional view taken on the line 3—3 of FIGURE 2.
Figure 4:
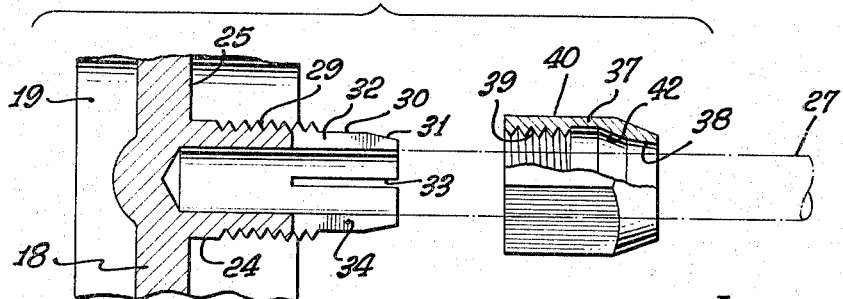
FIGURE 4 is a fragmentary exploded view showing the mounting parts ready for assembly.

In an embodiment of the invention chosen for the purpose of illustration there is shown a typical model racing car indicated by the reference character 10 shown in position upon a race track 11. The race track is of customary conventional design and includes a guide 12 which accommodates a shoe 13 to hold the model car in alignment on the race track as it travels along the course. It will be understood that the model car 10 contains an electric motor geared to the rear wheels to provide traction and controlled through wires (not shown) which are manipulated at a distance by the operator thereby to control the speed of the electric motor during travel of the car about the race track. The car as shown, has front wheels 14 and rear wheels 15 on a body 16. Since the mounting for both front and rear wheels is the same as the mounting for the visible rear wheel 15 of FIGURE 1 only will be shown and described in detail.

The rear wheel 15 consists of several parts namely, a hub 18 around which extends a rim 19. The rim is provided with outer and inner flanges 20 and 21, respectively, for holding a tire 22 in place on the rim. The hub 18, as noted, is attached at an inner face 23 to the rim 19 at a location intermediate outer and inner ends.

Concentrically located in the hub 18 is a bushing 24 which extends inwardly from an inner face 25 of the hub 18. The bushing is provided with a central bore 26 which is as nearly perfectly concentric with respect to the rim 19 as can be made. The bore 26 provides slip fit for an axle 27. In practice, the clearance between the bore 26 and the exterior of the axle 27 is in the neighborhood if .0005 inch. As noted, the depth of the bore is such that its inner end 28 approximately reaches the hub 18.

On the exterior the bushing is provided with threads 29 extending for a substantial portion of the length of the bushing. Near the free end is a cylindrical portion 30 having an outside diameter no greater than the root diameter of the threads 29. A bevel 31 is provided at the end of a hub. Slits 32, 33, 34, and 35, four in number in the present embodiment, extend through the wall of the bushing throughout the length of the cylindrical portion 30 and extend partly into the threads 29. The slits are in pairs opposite each other to improve ease of precision manufacture.

A collet nut 37 is adapted to fit over the hub 18. The collet nut has a beveled hole 38 near one end which draws upon the bevel 31 to tighten the bushing upon the axle 27. At the opposite end is a threaded bore 29. Intermediate the threaded bore 39 and the hole 38 is a smooth wall cylindrical portion 40, the diameter of which approximates the maximum diameter of the threads 29. Joining the smooth wall cylinder portion 40 and the hole 38 is an annular beveled portion 42 joining the beveled hole 38 with the cylindrical portion 40.

Concentricity which is an important element in the assembly results largely in providing a hole for the axle of substantial depth in the unsplit portion of the hub 18. Collet-type locking as provided by the collet nut 37, does not alter the concentricity, but does, however, securely lock the wheel to the axle. It is also of consequence that there is provided a shorter over-all length by threading inwardly upon the bushing to a location near its junction with the hub 18. The split section extends through several turns of the thread.

The shortened length is enhanced by threading relatively deeply into the collet nut 37 to a location near the annular beveled portion 42.

The order of machining is also something of consequence when the device is made. Metal is first machined out of the inner portions of the wheel mount to relieve strain, then the bushing on the hub is turned. Following this, the bore 26 is drilled, then threaded and ultimately slit. When this sequence is followed concentricity is appreciably improved.

Model cars equipped as described with the wheel mount of the invention exhibit appreciably less vibration and follow the track much more readily than those equipped by prior art wheel connections.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A model car wheel for mounting on an axle comprising a hub, a rim concentrically mounted on the hub, and means forming a releasable connection for said hub on said axle, said means comprising a bushing forming part of the hub, said bushing having one end attached to and integral with the hub and a free end, said bushing having a longitudinal bore therein concentric with said rim and extending from said free end to a location adjacent but not through said one end, and an inner tapered bottom for said bore adjacent said one end, said bore having a diameter providing a slip fit reception for said axle and said bottom forms a stop fixing the location of said wheel on said axle, said bushing having exterior threads thereon and a free end portion of said bushing extending beyond the threads, said free end portion having a plurality of slits extending from the free end inwardly, and a collet nut having a bore therethrough adapted to receive said axle, internal threads at one end of the nut adapted to engage the threads on said hub, one of said portions being tapered radially inwardly and endwardly and adapted to engage the other of said portions when the collet nut is attached to the bushing whereby to compress portions between the splits inwardly into engagement with the axle and thereby to hold the axle in concentrically mounted relationship with said hub.

2. A model car wheel mounting comprising a hub, a rim concentrically mounted on the hub, an axle upon which said hub is mounted and means forming a releasable connection between said hub and said axle, said means comprising a bushing forming part of the hub, said bushing having one end attached to and integral with said hub and a free end, said bushing having a longitudinal bore therein concentric with said rim and extending from said free end to a location adjacent but not through said one end, and an inner tapered bottom for said bore at said one end, said bore having a diameter providing a slip fit reception for said axle and said bottom providing a stop fixing the location of said wheel on said axle, a portion of said bushing at an end thereof adjacent the hub having exterior threads thereon and an opposite end of said bushing having a smooth circumference no greater in diameter than the root diameter of said threads, the outermost end of said smooth circumference having a radially inwardly sloping taper, said bushing having a plurality of slits extending from the outermost end inwardly a distance cutting through some of the threads, and a collet nut having a bore therethrough adapted to receive said axle, internal threads at one end of the collet nut adapted to engage the threads on said hub, and a tapered portion of said bore extending from a point adjacent the threads radially inwardly and endwardly, said last identified tapered portion being adapted to engage the sloping taper of the bushing when the collet nut is attached thereto whereby to compress portions between the splits inwardly into engagement with the axle and thereby to hold the axle in concentrically mounted relationship with said hub.

3. A model car wheel mounting comprising a hub, a rim concentrically mounted on the hub at the outside end thereof, a tire on the rim, an axle upon which said hub is mounted and means forming a releasable connection between said hub and said axle, said means comprising a bushing forming part of the hub, said bushing having one end adjacent and integral with said hub and a free end, said bushing having a longitudinal bore therein concentric with said rim and extending from said free end to a location adjacent but not through the hub, and an inner tapered bottom for said bore at said one end, said bore having a diameter providing a slip fit reception for said axle and said bottom providing a stop fixing the location of said wheel on said axle, a portion of said bushing adjacent the hub having exterior threads thereon and a free end of said bushing having a smooth circumference no greater in diameter than the root diameter of said threads, the outermost end of said smooth circumference having a radially inwardly sloping taper, said bushing having a plurality of slits extending from the outermost end inwardly a distance cutting through some of the threads, and a collet nut having a bore therethrough larger in diameter than the axle and adapted to receive said axle, internal threads at one end of the collet nut adapted to engage the threads on said hub, and an inside tapered portion of said bore extending from a point adjacent the threads radially inwardly and endwardly, said last identified tapered portion being adapted to engage the sloping taper of the bushing when the collet nut is attached thereto whereby to compress portions of the hub between the splits radially inwardly into engagement with the axle thereby to hold the axle in concentrically mounted relationship with said hub and said rim.

References Cited

UNITED STATES PATENTS

| 1,420,295 | 6/1922 | Tait | 287—53 X |
| 2,665,521 | 1/1954 | Ford | 46—221 |
| 2,869,237 | 1/1959 | Berge | 287—53 X |
| 2,940,781 | 6/1960 | Erikson. | |

FOREIGN PATENTS

| 77,340 | 2/1949 | Czechoslovakia. |
| 614,507 | 12/1948 | Great Britain. |

BENJAMIN HERSH, *Primary Examiner.*

RICHARD J. JOHNSON, *Examiner.*